(12) United States Patent
Yohanan et al.

(10) Patent No.: US 7,834,643 B2
(45) Date of Patent: Nov. 16, 2010

(54) SYSTEMS AND METHODS FOR REDUCING DISTORTION IN A POWER SOURCE USING AN ACTIVE HARMONICS FILTER

(75) Inventors: Tom G. Yohanan, Broken Arrow, OK (US); John M. Leuthen, Claremore, OK (US); Jerald R. Rider, Tulsa, OK (US); Michael C. Underwood, Owasso, OK (US)

(73) Assignee: Baker Hughes Incorporated, Houston, TX (US)

( * ) Notice: Subject to any disclaimer, the term of this patent is extended or adjusted under 35 U.S.C. 154(b) by 348 days.

(21) Appl. No.: 12/058,030

(22) Filed: Mar. 28, 2008

(65) Prior Publication Data

US 2009/0243398 A1 Oct. 1, 2009

(51) Int. Cl.
*G01R 23/20* (2006.01)
(52) U.S. Cl. .................. 324/623; 323/205
(58) Field of Classification Search .......... 324/620, 324/623; 307/105; 323/205
See application file for complete search history.

(56) References Cited

U.S. PATENT DOCUMENTS

| | | | |
|---|---|---|---|
| 4,964,055 A * | 10/1990 | Grassel et al. ............... 702/77 |
| 5,345,375 A | 9/1994 | Mohan | |
| 5,465,203 A | 11/1995 | Bhattacharya | |
| 5,499,178 A | 3/1996 | Mohan | |
| 5,568,371 A | 10/1996 | Pitel | |
| 5,656,924 A | 8/1997 | Mohan | |
| 5,677,832 A | 10/1997 | Tissier | |
| 6,049,473 A | 4/2000 | Jang | |
| 6,208,945 B1 | 3/2001 | Koda | |
| 6,282,104 B1 | 8/2001 | Kern | |
| 6,295,216 B1 | 9/2001 | Faria | |
| 6,326,796 B1 | 12/2001 | Koda | |
| 6,604,056 B2 | 8/2003 | Ulrich | |
| 6,681,190 B2 | 1/2004 | Ulrich | |
| 6,882,549 B2 * | 4/2005 | Huggett et al. ............. 363/40 |
| 6,882,550 B1 | 4/2005 | Baumgart | |
| 7,126,519 B1 * | 10/2006 | Xu ........................ 341/144 |
| 2003/0043603 A1 * | 3/2003 | Schreiber .................. 363/37 |
| 2008/0187035 A1 * | 8/2008 | Nakamura et al. ......... 375/232 |

* cited by examiner

*Primary Examiner*—Vincent Q Nguyen
(74) *Attorney, Agent, or Firm*—Law Offices of Mark L. Berrier

(57) ABSTRACT

Systems and methods for reducing harmonic distortion in a power system resulting from non-linear loading on the power system. The power at an interface with a power source is measured, and then distortion in the waveforms of the supplied power is identified. Cancellation signals which cancel all or part of the distortion are then generated and injected at the interface. In one embodiment, the power is sampled to determine the waveform, and then a Fast Fourier Transform is performed on the waveform to convert it to the frequency domain. Harmonics of the fundamental frequency can then be identified, and conjugates of the harmonics generated. An inverse Fast Fourier Transform is performed on the conjugates to generate a signal which is amplified to produce the cancellation signal.

18 Claims, 4 Drawing Sheets

SYSTEMS AND METHODS FOR REDUCING DISTORTION IN A POWER SOURCE USING AN ACTIVE HARMONICS FILTER

BACKGROUND

1. Field of the Invention

The invention relates generally to electrical power systems, and more particularly to systems and methods for reducing harmonic distortion in a power system resulting from non-linear loading on the power system.

2. Related Art

Variable speed drives are commonly used in the petrochemical industry to power electric submersible pumps. These pumps are often used in downhole applications such as pumping oil from wells. Because variable speed drives provide advantages such as improved energy usage, improved process control, increased production and increased reliability with respect to competing technologies, the use of variable speed drives has increased substantially in recent years.

All the variable speed drives have a number of advantages, there are also some disadvantages associated with them. Because a variable speed drive is a non-linear load, the drive draws current from its power source (e.g., a utility power grid) in a non-linear fashion. This, in turn, causes the power source to experience distortion as it provides the non-linear current to the variable speed drive. This distortion can cause the supply voltage to be distorted (non-sinusoidal) which can then result in problems such as overloaded electrical distribution equipment (e.g., transformers) tripped circuit breakers, resonance with power factor correction capacitors, interference, and so on. These problems are not simply local to the variable speed drive, but also affect the other consumers that receive power from the power source.

In order to minimize the negative effects of harmonic distortion which are caused by non-linear loads such as variable speed drives, a standard (IEEE 519) was developed and established to define limits for the amount of distortion that can be caused in a power system. This standard lead to the implementation of controls in some equipment to reduce the distortion caused by non-linear loading in the equipment. These controls may, for example, implement harmonic filtering using passive filters.

Passive harmonic filters may work very well in a number of applications, but they also have a number of disadvantages. For instance, passive harmonic filters work well if the harmonics of interest are well known and do not vary with time, but variable speed drives which are used in applications such as electric submersible pumps change operating frequencies and consequently produce changing harmonics. Further, if power is interrupted, passive filters normally experience in a large and potentially damaging inrush of current when power is restored. Also, passive filters may themselves generate harmonics due to resonance in their components. Still further, passive filters normally attenuate not only the unwanted harmonics, but also the fundamental frequency of the supplied power.

It would therefore be desirable to provide systems in methods for reducing harmonic distortion that arises in power systems by non-linear loads which do not suffer from the disadvantages of passive harmonic filters. It would also be desirable to provide systems and methods for reducing harmonic distortion which can be implemented in conjunction with existing equipment which does not already incorporate mechanisms for reducing or eliminating harmonic distortion.

SUMMARY OF THE INVENTION

This disclosure is directed to systems and methods for reducing harmonic distortion in a power system resulting from non-linear loading on the power system that solve one or more of the problems discussed above. In various embodiments, the power at an interface with a power source is measured to determine the distortion in the waveforms of the supplied power. Cancellation signals are then generated and injected at the interface to cancel out some or all of the distortion.

One embodiment comprises a system that uses an active filter to cancel selected harmonics in an electrical grid. The system includes capacitors for energy storage, a control system, an inverter section, and filter components. The energy from the fundamental component of the power source is drawn to maintain the voltage on the capacitors, which then supply the energy used to cancel offending harmonics. The offending harmonic spectrum is identified and one or more of the offending harmonics are partially or completely canceled as deemed necessary by the user. The system uses Fast Fourier Transforms and Inverse Fast Fourier Transforms (FFT/IFFT) to accomplish this task. In the IFFT calculation, the offending harmonics are conjugated so that they can be injected back into the line for cancellation.

There are customers who pay a penalty if the harmonic distortion of the power system exceeds a certain amount. In some cases, the distortion requirement can be met by canceling one harmonic. In some cases, the harmonic of interest will vary with time. Feedback can be used to command the active filter to cancel the harmonic of interest. If the system only has to cancel a portion of the offending harmonics, the size of the unit would be much smaller than a unit that cancels all the harmonics.

One embodiment comprises a method for reducing distortion in a power source from which one or more pieces of equipment draw current in a non-linear fashion. In this embodiment, the method includes identifying distortion in the voltage waveform of the power source, generating a cancellation signal to cancel at least a portion of the identified distortion, and injecting the cancellation signal into the interface between the power source and the equipment.

In one embodiment, the waveform is sampled over a series of intervals and the waveform is reconstructed from the samples. The waveform can then be examined to identify the distortion from a simple sine wave, such as harmonics of a fundamental frequency in the waveform. This may be done, for example, by performing a Fast Fourier Transform on the waveform in the time domain to convert the waveform to a spectral representation in the frequency domain. The cancellation signal can then be generated by selecting one or more of the harmonics and conjugating them. An inverse Fast Fourier Transform can be performed on the conjugates to generate control signals that can be input to power electronics to produce the cancellation signal. The method can be implemented, for example, in a stand-alone unit that is connected to the interface between a utility power grid and one or more variable speed drives.

Another embodiment comprises a system for reducing distortion in a power source which from which one or more pieces of equipment draw current in a non-linear fashion. The system comprises signal acquisition circuitry, a control unit and a power electronics unit. The signal acquisition circuitry is configured to identify the voltage waveform of the power source. The signal acquisition circuitry provides this information to the control unit, which is configured to identify distortion in the waveform. Based on the identified distortion, the control unit generates control signals that are provided to the power electronics unit. The control signals cause the power electronics unit to generate a cancellation signal that is injected into the interface to cancel all or part of the distortion.

Numerous other embodiments are also possible.

BRIEF DESCRIPTION OF THE DRAWINGS

Other objects and advantages of the invention may become apparent upon reading the following detailed description and upon reference to the accompanying drawings.

Figure 1:
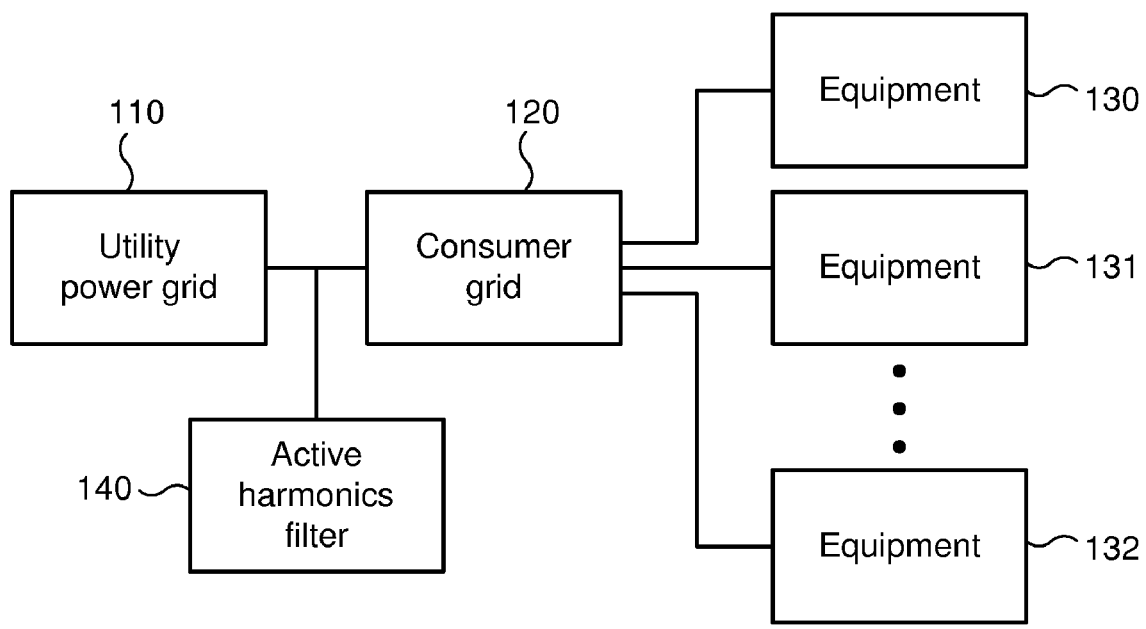
FIG. 1 is a diagram illustrating the configuration of a system which implements an active harmonic filter in accordance with one embodiment.

While the invention is subject to various modifications and alternative forms, specific embodiments thereof are shown by way of example in the drawings and the accompanying detailed description. It should be understood, however, that the drawings and detailed description are not intended to limit the invention to the particular embodiment which is described. This disclosure is instead intended to cover all modifications, equivalents and alternatives falling within the scope of the present invention as defined by the appended claims.

DETAILED DESCRIPTION OF PREFERRED EMBODIMENTS

One or more embodiments of the invention are described below. It should be noted that these and any other embodiments described below are exemplary and are intended to be illustrative of the invention rather than limiting.

As described herein, various embodiments of the invention comprise systems and methods for reducing harmonic distortion in a power system resulting from non-linear loading on the power system. This is accomplished by determining the voltage and current waveforms, determining the distortion in the waveforms of the supplied power, and then generating and injecting cancellation signals to cancel out some or all of the distortion.

In one particular embodiment, one or more variable speed drives are connected to a utility power grid. When the variable speed drives are operated, the non-linear loading of the drives causes harmonic distortion in the power supplied by the utility grid. An active harmonics filter is provided at the interface between the variable speed drives and the utility grid in order to detect and cancel some or all of the distortion in the voltage on the utility grid.

The active harmonics filter includes a sensing subsystem coupled to the interface between the variable speed drives and the utility grid in order to measure the voltage and current at which the power is supplied. The distortion (or "pollution") in the supplied voltage can then be determined. In this particular embodiment, the measured voltage and current information is provided to a control subsystem of the active harmonics filter, which determine the distortion in the supplied power by performing a Fast Fourier Transform on the voltage waveform. This converts the time-domain waveform into a frequency-domain representation of the supplied voltage. The frequency-domain representation allows the harmonics of the fundamental frequency to be easily identified and quantified.

After the components of the distortion are identified, cancellation signals can be determined by the control subsystem. For instance, if one of the distortion components has a frequency of $\omega$, an amplitude of A, and a phase of $\theta$, it can be canceled by a conjugate signal having frequency $\omega$, amplitude A, and phase $\theta+\pi$ (radians.) The cancellation signal may also partially cancel the corresponding distortion component if the amplitude is less than A. The control subsystem can provide the appropriate signals to a power electronics subsystem, which can then generate the cancellation signals. These signals are then injected into the interface between the variable speed drives and the utility grid to cancel out the corresponding distortion components.

Referring to FIG. 1, a diagram illustrating the configuration of a system which implements an active harmonic filter in accordance with one embodiment is shown. In this embodiment, power is provided to consumers through a utility power grid 110. The power is ultimately provided in this instance to a number of different pieces of equipment exemplified by equipment blocks 130-132. The equipment may include many different types of systems, or it may include multiple pieces of essentially identical equipment. In one example of interest, equipment 130-132 consists of variable speed drives for electric submersible pumps in a series of oil wells.

In the embodiment of FIG. 1, because power needs to be distributed to multiple pieces of equipment, the equipment (130-132) is connected to the utility power grid (110) through a consumer grid 120. Consumer grid 120 is connected to utility power grid 110 at an interface represented by node 115. The interface between utility power grid 110 and consumer grid 120 provides a convenient point at which to determine the effects of the non-linear loading presented by equipment 130-132, as well as to inject cancellations signals in order to reduce the distortion caused by this non-linear loading. Active harmonic filter 140 is connected to the interface (node 115) in order to provide these functions.

Figure 2:
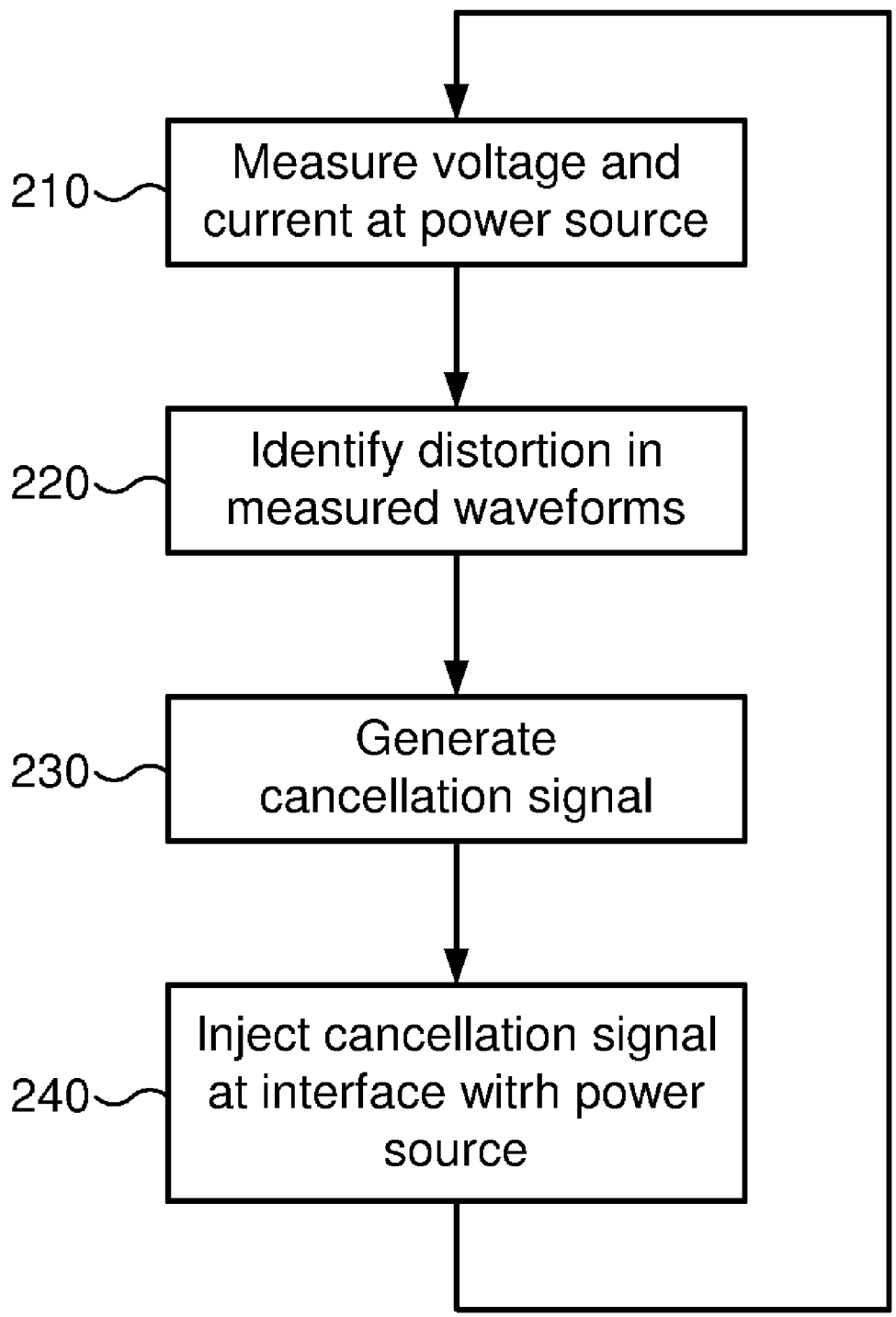
FIG. 2 is a simple flow diagram illustrating the basic operation of an active harmonic filter such as the one illustrated in FIG. 1.

Referring to FIG. 2, a simple flow diagram illustrating the basic operation of an active harmonic filter such as the one illustrated in FIG. 1 is shown. As noted above, the various pieces of equipment which are connected to the utility power grid through the consumer grid draw current from the power source in a non-linear fashion. The voltage and current at the interface to the utility power grid consequently deviate from simple sinusoidal waveforms. The deviation consists of harmonics that are generated by the equipment.

At block 210, the active harmonic filter measures the voltage and current at the interface to the utility power grid. The voltage and current are sampled so that the waveform for each can be reconstructed from the measurements. Based on the reconstructed waveforms, the active harmonic filter identifies the harmonic distortion which is present in the signals (block 220.) Once the distortion in the signals has been identified, the active harmonic filter can generate cancellation signals corresponding to the distortion (block 230.) These cancellation signals may be designed to cancel all, or only a part of the distortion. The generated cancellation signals are then injected into the interface with the utility power grid (block 240.) The injected signals cancel the effects of the non-linear loading and consequently reduce the distortion which is pushed back onto the utility power grid.

While the method of FIG. 2 is depicted as having a series of discrete steps, it should be noted that each of the steps may be performed continuously. Thus, while the waveform information which is sampled at block 210 is being examined to identify distortion in the waveforms, the system continues to sample the voltage and current at the utility grid interface. Similarly, generation of the cancellation signals and injection of these signals into the interface proceeds concurrently with the measurements and analysis of the measured waveforms.

Figure 3:
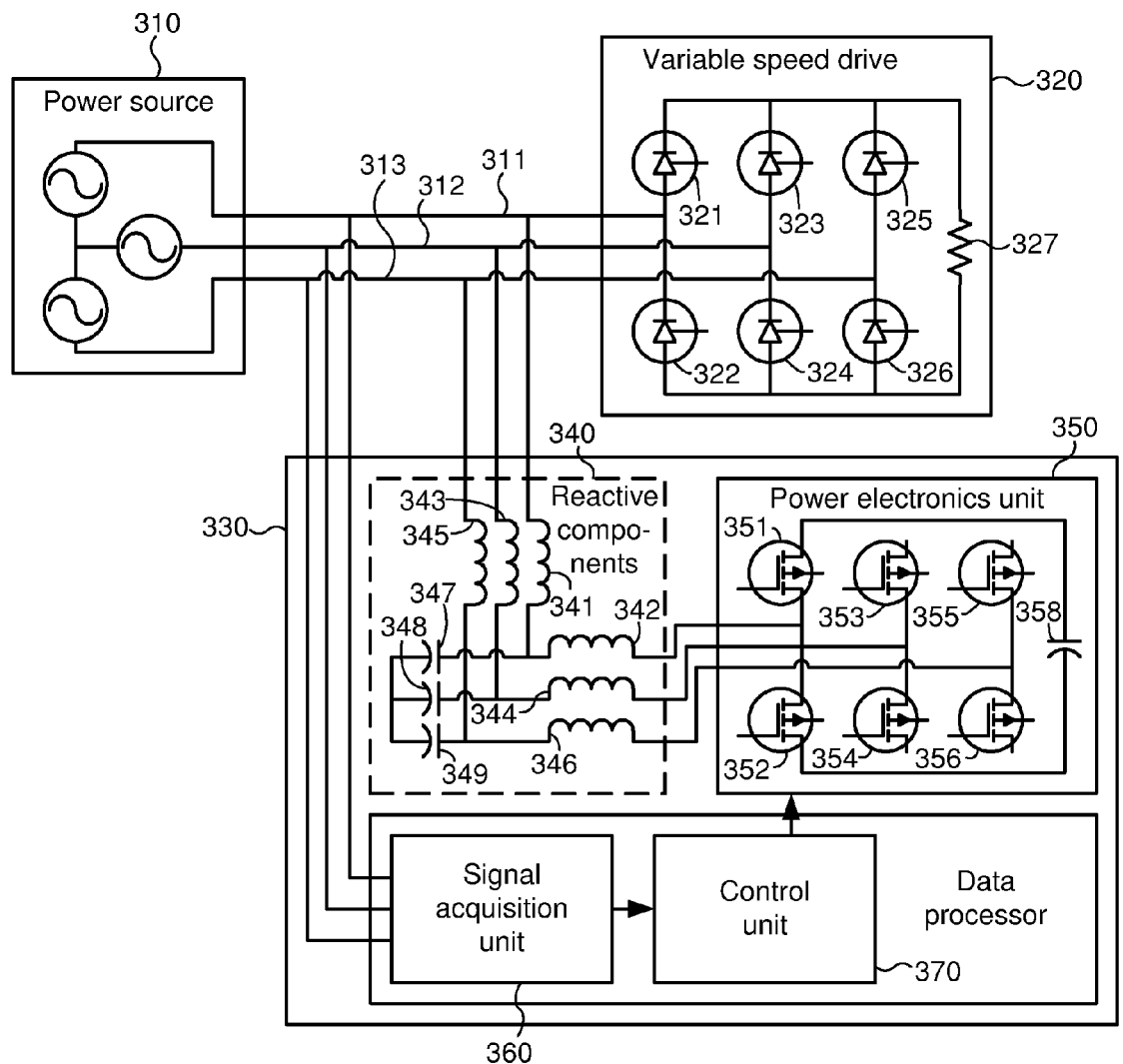
FIG. 3 is a more detailed diagram illustrating the structure of an active harmonic filter and its interconnection with a power source and load in accordance with one embodiment.

Referring to FIG. 3, a more detailed diagram illustrating the structure of an active harmonic filter and its interconnection with a power source and load is shown. For purposes of clarity, the example of FIG. 3 includes only a single piece of equipment which is a variable speed drive 320. The utility power grid is depicted as a simple three-phase power source 310. Active harmonic filter 330 is connected to each of the three lines which couple variable speed drive 320 to power source 310.

As indicated above, utility power grid 310 provides three-phase AC power. The power is conveyed to variable speed drive 320 by three power lines 311-313. Each of power lines 311-313 is connected to variable speed drive 320 between a corresponding pair of silicon controlled rectifiers (SCR's.) Line 311 is connected between SCR's 321 and 322, line 312 is connected between SCR's 323 and 324, and line 313 is connected between SCR's 325 and 326. It should be noted that the structure of variable speed drive 320 which is depicted in FIG. 3 only includes the converter section of the drive—it does not include the inverter section which provides the output power necessary to drive a pump. The inverter section is unnecessary for the purposes of this discussion because the non-linear loading on the power source caused by the variable speed drive is a result of the converter section. This portion of the variable speed drive is therefore represented by a simple load resistor 327.

Figure 4A:
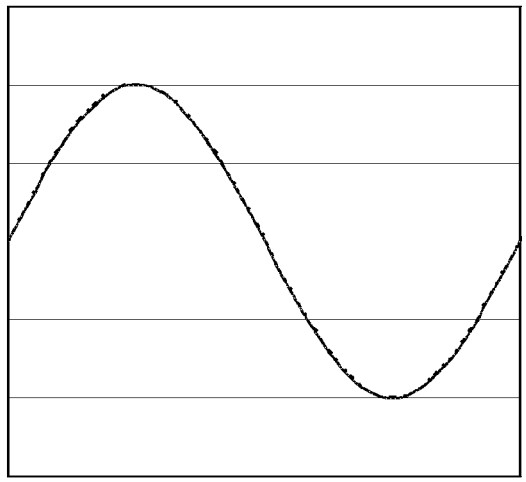
FIGS. 4A and 4B are a pair of diagrams showing the waveforms of the power provided by the utility power grid, both with and without distortion.
Figure 4B:
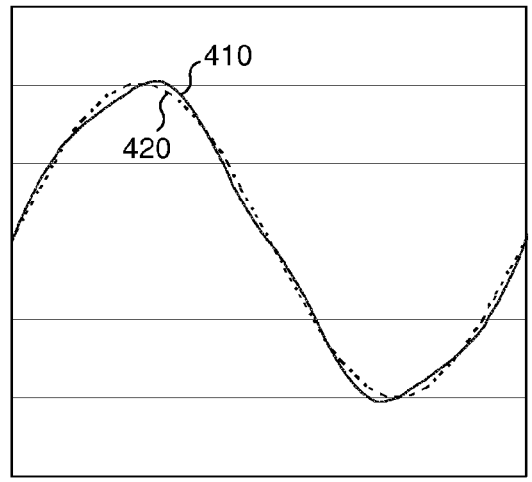

Referring to FIGS. 4A and 4B, a pair of diagrams showing the waveforms of the power provided by the utility power grid are shown. FIG. 4A shows a waveform corresponding to linear loading on the power grid, while FIG. 4B shows a waveform corresponding to non-linear loading. It can be seen that, when the loading on the power grid is linear, the waveform is sinusoidal. While there may be some deviation from a perfect sine wave, the deviation typically is minor. When the load on the power grid is non-linear, harmonic distortion is introduced into the wave, causing it to deviate more substantially from the sine wave. FIG. 4B shows a waveform, 410, corresponding to the non-linear loading and also shows a sine wave, 420, which is provided for comparison purposes. Similar waveforms are normally seen on each of the three power lines.

Referring again to FIG. 3, an active harmonic filter 330 is coupled to each of power lines 311-313 between utility power grid 310 and variable speed drive 320. Active harmonic filter 330 includes a signal acquisition unit 360, a control unit 370, a power electronics unit 350 and a set of reactive components 340. Signal acquisition unit 360 is connected to power lines 311-313 in order to measure the voltage and current on each of the power lines. Signal acquisition unit 360 senses the voltages and current and then uses analog-to-digital converters to convert the sensed values into digital data.

The voltage and current data collected by signal acquisition unit 360 is provided to control unit 370. Control unit 370 consists of a data processing unit, such as a digital signal processor which is configured to process the received data and to thereby identify the harmonics that are present in the waveforms on power lines 311-313. Control unit 370 is also configured to generate, based on the identified, unwanted harmonics, control signals which are used to drive power electronics unit 350. These control signals are calculated to cause the power electronics unit to generate cancellation signals which counteract the detected harmonics when injected into the interface with the power source.

Control unit 370 may use various different types of algorithms to process the data received from signal acquisition unit 360. In one embodiment, control unit 370 employs Fast Fourier Transform algorithms to convert the received data from the time domain into the frequency domain. When data for a complete cycle (about 16.67 milliseconds) of the power signal is received by control unit 370, a Fourier Transform is performed on this data using the Fast Fourier Transform algorithms. The result is data corresponding to a spectral plot of the power signal. This data shows the magnitude of each harmonic component that is present in the signal in addition to the fundamental frequency of the signal.

Figure 5A:
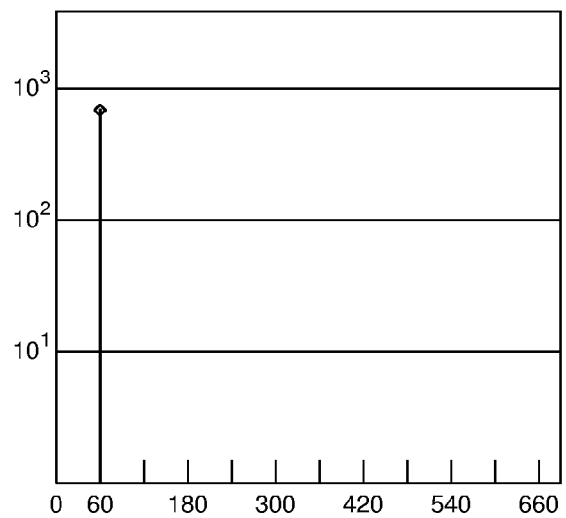
FIGS. 5A and 5B are a pair of diagrams with spectral (frequency domain) plots of the utility power grid signals of FIGS. 4A and 4B.
Figure 5B:
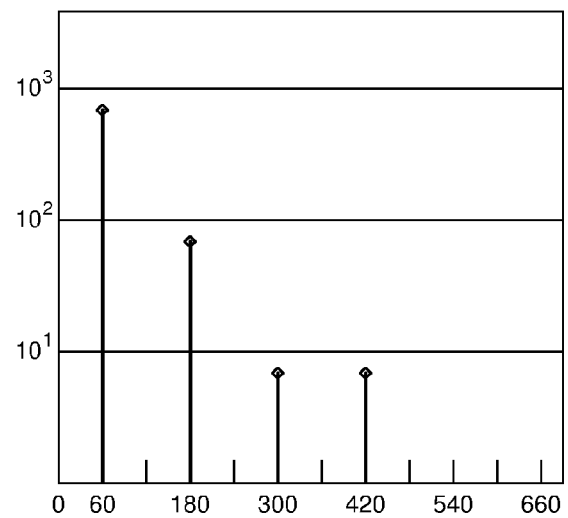

Referring to FIGS. 5A and 5B, a pair of diagrams with spectral (frequency domain) plots of the utility power grid signals of FIGS. 4A and 4B are shown. FIG. 5A is a spectral plot of the sine wave in FIG. 4A, while FIG. 5B is a spectral plot of the waveform in FIG. 4B. Referring to FIG. 4A, the illustrated waveform is a simple sine wave having a frequency of 60 Hz, and consequently a period of 16.67 milliseconds. Because the waveform of FIG. 4A is essentially a perfect sine wave, there is only one spectral component to the wave at 60 hertz. Consequently there is only a single line, or spike, and the spectral plot of FIG. 5A.

The waveform of FIG. 4B, on the other hand, is distorted by multiple harmonics of the fundamental frequency (60 Hz.) The distortion is apparent from the comparison of the waveform (410) to the sine wave (420) but the distortion is not easily quantifiable in the time domain. When waveform for 10 is transformed into the frequency domain, the components of the distortion are easily identified and quantified. Referring to FIG. 5B, it can be seen that the sampled waveform consists of the primary signal at the fundamental frequency of 60 Hz, as well as distortion components consisting of the third, fifth and seventh harmonics (at 180 Hz, 300 Hz and 420 Hz, respectively.) The magnitudes of the third, fifth and seventh harmonics have amplitudes that are approximately 10%, 1% and 1%, respectively, of the magnitude of the component at the fundamental frequency.

Once the components of the distortion in the sensed signal are identified by control unit 370, the control unit is configured to determine cancellation signals which can be injected into the interface to the power source to reduce the distortion. In this embodiment, control unit 370 is configured to identify the needed cancellation signals by simply conjugating one or more of the distortion components. In other words, for each distortion component which is to be canceled, the control unit takes the frequency, magnitude and phase of the component and then shifts the phase by 180°. When this cancellation signal is added to the distorted power signal, it will cancel out the corresponding distortion component.

It should be noted that the control unit need not determine conjugates of all of the distortion components. It may be sufficient to cancel only a portion of the components that make the largest contribution to the distortion of the original signal. Additionally, the conjugates determined by the control unit need not completely cancel the selected distortion components. For instance, to partially cancel a distortion component having frequency $\omega$, amplitude A, and phase $\theta$, the control unit may generate a conjugate having frequency $\omega$, phase $\theta+\pi$, and amplitude $0.8*A$.

After control unit 370 has determined which frequency-domain cancellation signals are needed, the control unit performs an inverse Fast Fourier Transform on the frequency-domain signals. This produces a time-domain cancellation signal. A set of control signals corresponding to this time domain cancellation are then generated by the control unit. These control signals are provided to power electronics unit 350.

Power electronics unit 350 includes a set of six insulated gate bipolar transistors (IGBT's) 351-356 coupled to a capacitor bank 358. The IGBT's form three pairs, each of which is connected in series between the terminals of the capacitor bank. This configuration is similar to that of an inverter section in a variable speed drive. The control signals received from control unit 370 are applied to gate drivers, which in turn drive IGBT's 351-356 to generate the desired cancellation signals from the bus voltage across capacitor bank 358. Each cancellation signal is generated at the node between a corresponding one of the IGBT pairs. Thus, the gate drivers and IGBT's effectively translate the low voltage control signals from the control unit into high-voltage (480 volts) signals which are suitable to be injected into the interface to the utility power grid.

It should be noted that, since the active harmonic filter is controlling the reactive power, it will not need a converter section if it is properly designed. The control algorithm can manage the energy such that proper bus voltage will be maintained on the capacitor bank.

The cancellation signals generated by power electronics unit 350 are not simply injected directly into the interface with the power source, however. The signals are instead passed to reactive components 340. The reactive components serve two purposes. First, these components serve to filter the cancellation signals before they are injected into the power lines. Second, the reactive components provide some impedance between the active harmonic filter and the power source. The reactive components include reactors (inductors) 341-346, and capacitors 347-349. Each cancellation signal is coupled to a corresponding one of power lines 311-313 through a pair of the reactors which are connected in series between the power electronics and the corresponding power line. Thus, for example, the cancellation signal generated at the node between IGBT's 351 and 352 passes through reactors 341 and 342 before being injected into power line 311. The node between each serially connected pair of reactors is coupled to a common point through a corresponding one of capacitors 347-349.

It should be noted that the foregoing embodiment is intended to be exemplary, and that many variations from the implementations described above may be made in alternative embodiments. For instance, while the control unit of the exemplary embodiment described above implements Fast Fourier Transform algorithms to convert time-domain signals to the frequency domain (and subsequently uses inverse Fast Fourier Transform algorithms to convert conjugated frequency-domain signals to the time domain) the generation of cancellation signals may be performed in different ways.

One alternative embodiment, for example, implements control unit algorithms that are based on instantaneous reactive power theory. In this embodiment, the instantaneous voltages and currents measured at the power source interface are transformed into two orthogonal rotating vectors ($\alpha,\beta$) using Clarke's transform. This transform is given by the following equation.

$$\begin{pmatrix} i_0 \\ i_\alpha \\ i_\beta \end{pmatrix} := \sqrt{\frac{2}{3}} \cdot \begin{pmatrix} \frac{1}{\sqrt{2}} & \frac{1}{\sqrt{2}} & \frac{1}{\sqrt{2}} \\ 1 & \frac{-1}{2} & \frac{-1}{2} \\ 0 & \frac{\sqrt{3}}{2} & \frac{-\sqrt{3}}{2} \end{pmatrix} \cdot \begin{pmatrix} i_a \\ i_b \\ i_c \end{pmatrix} \qquad (1)$$

The instantaneous reactive power theory assumes balanced three phase currents and voltages. When the instantaneous power is synchronized with the fundamental power, the fundamental power becomes a DC offset. Harmonics that are present cause a ripple on this DC offset. After the DC offset is removed, the harmonics can be obtained by doing an inverse Clarke's transform. Control signals corresponding to these harmonics are then provided to the power electronics unit to generate cancellation signals as described above.

In yet another alternative embodiment, the algorithms implemented in the control unit are based on a synchronous reference frame methodology. In this scheme, the three phase voltages and currents provided by the power source are transformed to alpha and beta coordinates using equation (1) and are then transformed into a stationary (DQ) reference frame using Park's transform. Park's transform is shown below as equation (2).

$$\begin{pmatrix} i_d \\ i_q \end{pmatrix} := \begin{pmatrix} i_\alpha & i_\beta \\ -i_\alpha & i_\beta \end{pmatrix} \cdot \begin{pmatrix} \cos(\theta) \\ \sin(\theta) \end{pmatrix} \qquad (2)$$

In the DQ reference frame, the fundamental component becomes a DC quantity, with harmonics appearing as ripples on top of the DC component, similar to the embodiment based on instantaneous reactive power theory. The harmonics can therefore be obtained in the same manner as above, i.e., by performing an inverse Clarke's transform.

A comparison of the Fast Fourier Transform, instantaneous reactive power theory and synchronous reference frame methodologies (from Round, S. D., Ingram, D. M. E., "An evaluation of techniques for determining active filter compensating currents in unbalanced systems") is shown below in Table 1.

TABLE 1

|  | IRPT | SRF | FFT |
| --- | --- | --- | --- |
| Steady-state quality | Poor | good | excellent |
| Transient response speed | Excellent | good | excellent |
| Transient response quality | Good | good | poor |
| Requires voltages | Yes | no | no |
| Requires balanced 3-phase | Yes | yes | no |
| Number of filter stages | 2 | 3 | 0 |

The Fast Fourier Transform was implemented in the embodiment above because of the advantages of frequency-domain based harmonic cancellation over the time domain methods. For instance, since each frequency component and its magnitude can be ascertained using a Fast Fourier Transform, harmonics can be selectively cancelled. Additionally, common mode voltages can be cancelled. Still further, frequency based algorithms do not require a balanced three phase power system.

It should be noted that, while the foregoing description refers primarily to distortion components that comprise harmonics of the fundamental frequency of the supplied AC power, the method can be used to reduce distortion at frequencies that are not harmonics of this fundamental frequency. Also, while the description above uses a variable speed drive as an example of equipment that presents a non-linear load on the power source, embodiments of the invention may be implemented in connection with any type of equipment or device that presents a non-linear load.

Those of skill will appreciate that some of the illustrative logical blocks, modules, circuits, and algorithm steps described in connection with the embodiments disclosed herein may be implemented as electronic hardware, computer software (including firmware) or combinations of both. To clearly illustrate this interchangeability, various illustrative components, blocks, modules, circuits, and steps have been described above generally in terms of their functionality. Whether such functionality is implemented as hardware or software depends upon the particular application and design constraints imposed on the overall system. Those of skill in the art may implement the described functionality in varying ways for each particular application, but such implementation decisions should not be interpreted as causing a departure from the scope of the present invention.

The benefits and advantages which may be provided by the present invention have been described above with regard to specific embodiments. These benefits and advantages, and any elements or limitations that may cause them to occur or to become more pronounced are not to be construed as critical, required, or essential features of any or all of the claims. As used herein, the terms "comprises," "comprising," or any other variations thereof, are intended to be interpreted as non-exclusively including the elements or limitations which follow those terms. Accordingly, a system, method, or other embodiment that comprises a set of elements is not limited to only those elements, and may include other elements not expressly listed or inherent to the claimed embodiment.

While the present invention has been described with reference to particular embodiments, it should be understood that the embodiments are illustrative and that the scope of the invention is not limited to these embodiments. Many variations, modifications, additions and improvements to the embodiments described above are possible. It is contemplated that these variations, modifications, additions and improvements fall within the scope of the invention as detailed within the following claims.

What is claimed is:

1. A method for reducing distortion in a power source which from which one or more pieces of equipment draw current in a non-linear fashion, the method comprising:
   identifying distortion in a waveform of a voltage provided by the power source by performing a Fast Fourier Transform on the waveform in a time domain to convert the waveform to a spectral representation in a frequency domain and identifying spectral components at the harmonics of the fundamental frequency;
   generating a cancellation signal configured to cancel at least a portion of the identified distortion; and
   injecting the cancellation signal into an interface between the power source and the pieces of equipment.

2. The method of claim 1, wherein:
   identifying distortion comprises identifying one or more harmonics of a fundamental frequency in the waveform; and
   generating the cancellation signal comprises generating a signal which selectively cancels the identified harmonics in the waveform.

3. The method of claim 1, further comprising measuring the waveform at the interface.

4. The method of claim 3, wherein measuring the waveform comprises sampling the waveform over a series of intervals and reconstructing the waveform from the samples.

5. The method of claim 1, wherein identifying distortion in the waveform comprises identifying one or distortion components at harmonics of a fundamental frequency in the waveform.

6. The method of claim 1, wherein generating the cancellation signal comprises selecting one or more of the spectral components and conjugating the selected spectral components.

7. The method of claim 6, wherein generating the cancellation signal further comprises performing an inverse Fast Fourier Transform on the conjugates of the selected spectral components.

8. The method of claim 1, wherein the method is implemented in a stand-alone unit that is connected to an interface between a utility power grid and one or more variable speed drives.

9. The method of claim 1, wherein the power source is configured to provide three-phase power and the waveform comprises waveform components corresponding to each of the three phases of the power source.

10. A system for reducing distortion in a power source which from which one or more pieces of equipment draw current in a non-linear fashion comprising:
    signal acquisition circuitry configured to identify a waveform of a voltage provided by the power source;
    a control unit coupled to the signal acquisition circuitry and configured
       to perform a Fast Fourier Transform on the waveform in a time domain and thereby convert the waveform to a spectral representation in a frequency domain,
       to identify distortion in the waveform including spectral components at harmonics of the fundamental frequency, and
       to generate one or more control signals for cancellation of at least a portion of the identified distortion; and
    a power electronics unit coupled to the control unit and configured to receive the control signals and to generate a cancellation signal, wherein the power electronics unit is further coupled to an interface with the power source and configured to inject the cancellation signal into the interface.

11. The system of claim 10, wherein the control unit is configured to identify one or more distortion components at harmonics of a fundamental frequency in the waveform and to generate control signals which drive the power electronics unit to generate the cancellation signal so that the cancellation signal selectively cancels the identified harmonics.

12. The system of claim 10, wherein the signal acquisition circuitry is coupled to the interface and configured to measure the waveform at the interface.

13. The system of claim 12, wherein the signal acquisition circuitry is configured to sample the waveform over a series of intervals and reconstruct the waveform from the samples.

14. The system of claim 10, wherein the control unit is configured to identify one or more distortion components at harmonics of a fundamental frequency in the waveform.

15. The system of claim 10, wherein the control unit is configured to generate the cancellation signal by selecting one or more of the spectral components and conjugating the selected spectral components.

16. The system of claim 15, wherein the control unit is further configured to generate the control signals by performing an inverse Fast Fourier Transform on the conjugates of the selected spectral components.

17. The system of claim 10, further comprising reactive circuitry coupled between the power electronics unit and the interface, the reactive circuitry including one or more reactors coupled in series between the power electronics unit and the interface.

18. The system of claim 10, wherein the system comprises a subsystem of a variable speed drive.

* * * * *